UNITED STATES PATENT OFFICE.

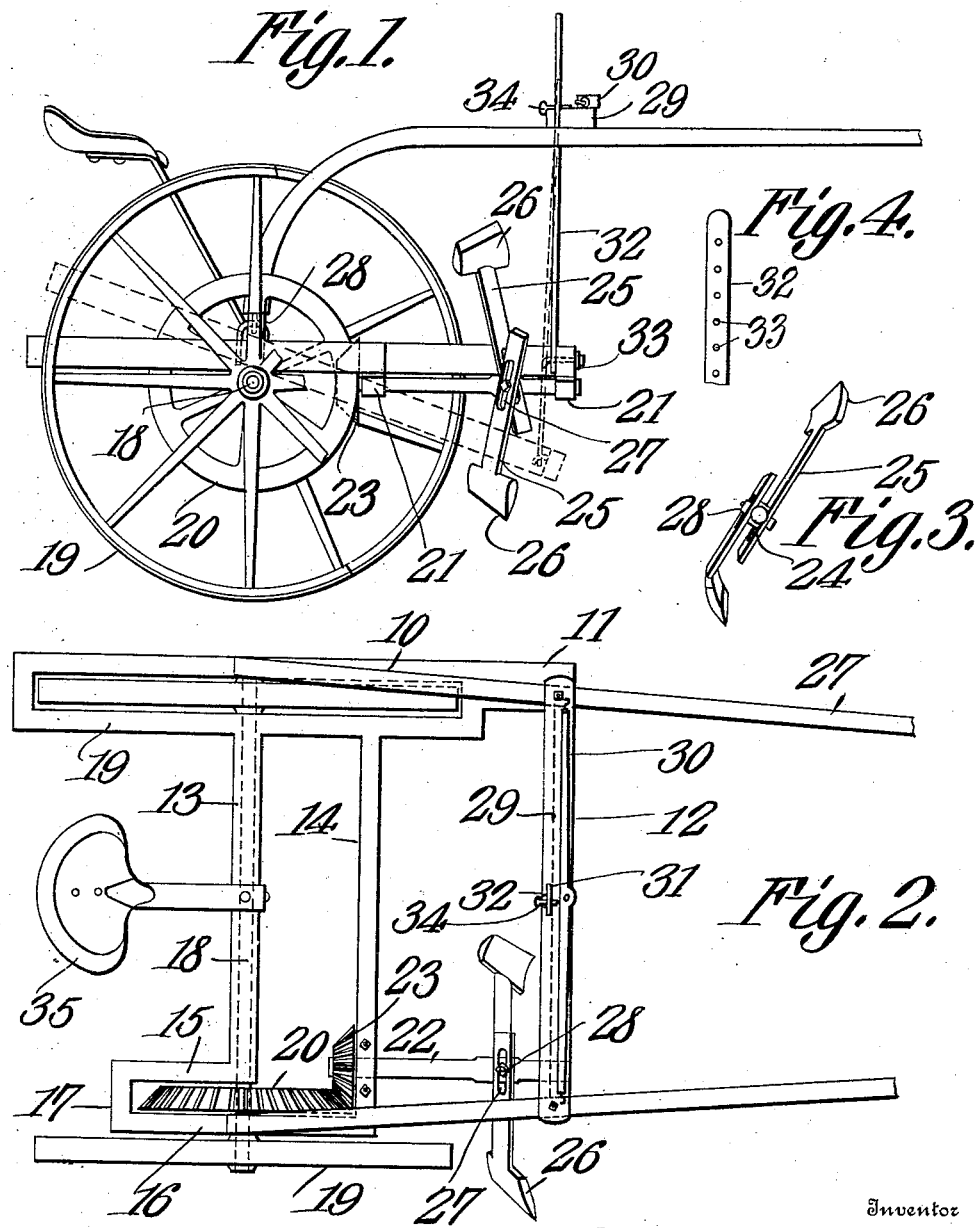

FRANK TRAWICK, OF HAMER, SOUTH CAROLINA.

COTTON-CHOPPER.

No. 904,379.  Specification of Letters Patent.  Patented Nov. 17, 1908.

Application filed March 27, 1908. Serial No. 423,773.

*To all whom it may concern:*

Be it known that I, FRANK TRAWICK, a citizen of the United States, residing at Hamer, in the county of Marion and State of South Carolina, have invented a new and useful Cotton-Chopper, of which the following is a specification.

This invention relates to agricultural implements, and more especially to those known as cotton choppers.

The object of this invention is to provide an improved form of cotton chopper, wherein the chopping-hoes will be in advance of the wheels and disposed to one side of the path of the draft animal.

Another object of the invention is to provide an improved means for attaching the chopping-hoes to the shaft which actuates the same.

A still further object of the invention is to provide an improved means for varying the cutting angle of the chopping hoes.

The invention consists in certain novel features of construction and arrangement of parts, hereinafter fully described, illustrated in the accompanying drawings, and specifically claimed.

In the accompanying drawings:—Figure 1 is a side elevation of the invention. Fig. 2 is a plan view thereof. Fig. 3 is a detail of the shaft and chopping hoes. Fig. 4 is a detail of the adjusting bar.

Similar numerals of reference are employed to indicate corresponding parts throughout the several figures of the drawings.

The body of this invention comprises a frame consisting of bars 10 surrounding one of the wheels, preferably the left hand wheel, as here shown, a bar 11 extending forward therefrom provided with an angled portion 12 setting transversely of the implement, and the front end of said bar. The transverse members 13 and 14 extend across the implement from the frame 10 and are provided with rearwardly extending portions 15 and 16 connected by a bar 17. On the frame 10 is rotatably mounted in suitable bearings an axle 18, wheels 19 are mounted on said axle being arranged in fixed relation thereto, so as to cause the axle to rotate when the wheels rotate. Upon the axle 18 and between the bars 15 and 16 is mounted a bevel gear 20 arranged to rotate with the axle. Upon the transverse portions of the frame 12 and 13 are provided bearings 21 in which is held a shaft 22. On the shaft 22 is fixed a pinion 23 meshing with the bevel gear 20. The shaft 22 is provided with a rectangular portion 24, said portion being made by flattening the shaft in one direction and broadening it in a direction substantially at right angles thereto. Upon the flattened portion of the shaft 22 are mounted arms 25 provided at the end with chopping hoes 26, and at the opposite ends thereof with slots 27 through which passes a bolt 28 to secure the chopping hoes to the shaft. The bolt 28 is so arranged that it passes through the slot in one of said hoes through the flattened portion of shaft 22 and out through the slot in the other hoe, a suitable nut being provided to clamp the two hoes and flattened portion of the shaft together.

Mounted on the frame 10 and bar 16 is a pair of thills 27 pivotally mounted as at 28 and provided with a cross bar 29 on which is mounted a suitable swingletree 30. The cross bar 29 is provided with an opening 31 and an adjusting bar 32 is mounted on the member 12 of the frame, being pivoted to the frame to permit slight angular movement, and passes through the opening 31. The bar 32 is provided at that portion which passes through the opening with a series of spaced holes 33 and a pin 34 is arranged to extend across the opening 31 in the bar 29, and pass through one of said holes. It will thus be observed that the angular relation between the frame and thills may be varied as desired by simply changing the position of the pin 34, from one hole to another. A suitable seat 35 is mounted on said frame for the use of the driver.

It will be seen from the description of this invention that there is provided a pair of chopping hoes which are adjustable as to angle and distance from the actuating shaft, and which lie out of the path of the draft animal, and that there is, also, provided means for quickly and readily varying the depth at which said hoes cut by the bar 32.

It will be observed that by a proper proportion of the gears 20 and 23, the device may be drawn along a row of cotton and chop down the plants at predetermined intervals, inasmuch as the blades 26 can be brought to work immediately over the center of the row. It will further be observed that by drawing the machine alongside the row that it is possible to remove plants that may have grown up between the rows and which it is desired to weed out.

It is obvious that many minor changes may be made in the form and construction of the device without departing from the principle thereof, and it is not, therefore, intended to confine the same to the exact form herein shown and described, but to include all such as properly come within the scope of the invention.

What is claimed is:—

In a cotton chopper, an axle, wheels mounted thereon to rotate therewith, a frame supported on said axle, a bevel gear mounted on said axle to rotate therewith, a shaft held at right angles to said axle, a second bevel gear held on said shaft to rotate therewith and meshing with the first bevel gear, a pair of chopper hoes provided with slotted handles mounted on said axle, a bolt passing through the axle and the slots in the chopper hoe handles to permit their adjustment to or from the shaft and variations in angles longitudinally of said shaft, a pair of thills pivotally connected with said frame above said axle, a cross bar rigidly connected with said thills having an aperture therein, an adjusting bar held on said frame passing through said aperture and provided with a series of spaced holes, and a pin adjusted to pass through one of the holes in the adjusting bar, to hold the frame and thills in the desired relation.

In testimony that I claim the foregoing as my own, I have hereto affixed my signature in the presence of two witnesses.

FRANK ✕ TRAWICK.
his mark

Witnesses:
J. W. McKay,
Wm. D. Trawick.